(12) United States Patent
Pasco, Sr.

(10) Patent No.: US 10,782,062 B2
(45) Date of Patent: Sep. 22, 2020

(54) PROTECTIVE STRUCTURE FOR REFRIGERATION UNITS

(71) Applicants: Intermodal Maintenance Group L.L.C., Bedford Park, IL (US); Julia A Pasco, Mokena, IL (US)

(72) Inventor: Stephen A Pasco, Sr., Mokena, IL (US)

(73) Assignee: Intermodal Maintenance Group L.L.C., Bedford Park, IL (US)

( * ) Notice: Subject to any disclaimer, the term of this patent is extended or adjusted under 35 U.S.C. 154(b) by 57 days.

(21) Appl. No.: 16/273,580

(22) Filed: Feb. 12, 2019

(65) Prior Publication Data
US 2020/0256611 A1    Aug. 13, 2020

(51) Int. Cl.
*F25D 19/00* (2006.01)
*B60P 3/20* (2006.01)
*F25D 23/00* (2006.01)

(52) U.S. Cl.
CPC .............. *F25D 19/003* (2013.01); *B60P 3/20* (2013.01); *F25D 23/006* (2013.01)

(58) Field of Classification Search
CPC ...... F25D 23/006; F25D 19/00; F25D 19/003; B60P 3/20
See application file for complete search history.

(56) References Cited

U.S. PATENT DOCUMENTS

| | | | |
|---|---|---|---|
| 5,491,980 A * | 2/1996 | Yingst | F25B 47/022 62/237 |
| 9,638,456 B2 * | 5/2017 | Renken | F25D 23/006 |
| 2017/0080780 A1 * | 3/2017 | Commault | B60H 1/00014 |
| 2018/0264909 A1 * | 9/2018 | Lanuzel | B60H 1/3232 |
| 2019/0145690 A1 * | 5/2019 | Chopko | F25D 19/003 29/890.035 |

* cited by examiner

*Primary Examiner* — Filip Zec
(74) *Attorney, Agent, or Firm* — Knechtel, Demeur & Samlan

(57) ABSTRACT

A protective frame for refrigeration units mounted on shipping containers or trailers. There is a bottom horizontal frame assembly and an top frame assembly, both attached to the refrigeration unit. Vertical frame braces connect the top and bottom frame assemblies. Hinges connect the top frame assembly to the protective frame allowing the top frame to pivot upward allowing access to the refrigeration unit for maintenance.

14 Claims, 7 Drawing Sheets

PROTECTIVE STRUCTURE FOR REFRIGERATION UNITS

BACKGROUND OF THE INVENTION

This invention relates to a protective structure for refrigeration units installed on the front of trailers or on intermodal shipping containers. Refrigerated intermodal shipping containers and trailers have the refrigeration units mounted on one end of the intermodal shipping container or on the front top end of the trailer. When the intermodal shipping container is lifted off the vehicle on which it is transported to be stacked on or off a ship, the intermodal containers often bump into objects resulting in damage to the refrigeration unit. Similarly, the front end of trailers often contacts other trailers or objects when being transported onto and from rail cars damaging the refrigeration unit. Repairs to the refrigeration units are expensive, and time consuming, resulting in the shipping containers and trailers not being available to transport loads. Throughout this application, the term "shipping container" is meant to include intermodal shipping containers or trailers hauled by any means or parked, and any similar containers that are used for the transport of goods, all if which have a refrigeration unit mounted externally on the shipping container.

Thus, it is an object of Applicant's invention to provide a protective frame for refrigeration units mounted on shipping containers when transported or parked, yet still allows complete access to the refrigeration units for maintenance.

SUMMARY OF THE INVENTION

The shipping container has the refrigeration unit mounted on the front end of the shipping container or at the front end of a trailer. The protective frame forms an enclosure around the perimeter of the refrigeration unit. The protective frame, when fully assembled and mounted to the refrigeration unit, comprises a top frame, a bottom frame, and two vertical braces that connect the top and bottom frames. The protective frame is secured to the refrigeration unit with a combination of bolts and spacers. The top frame has a hinged design that allows the top frame to pivot upward and away from the refrigeration unit. This allows the top door of the refrigeration unit to be pivoted upwardly into the opened position for maintenance without interference from the protective frame. The design of the protective frame further allows access to the lower front doors of the refrigeration unit without removing any part of the protective frame. The protective frame provides protection to the refrigeration unit while posing little or no encumbrance to the normal maintenance and fueling of the refrigeration unit.

DESCRIPTION OF THE PREFERRED EMBODIMENT

Figure 1:
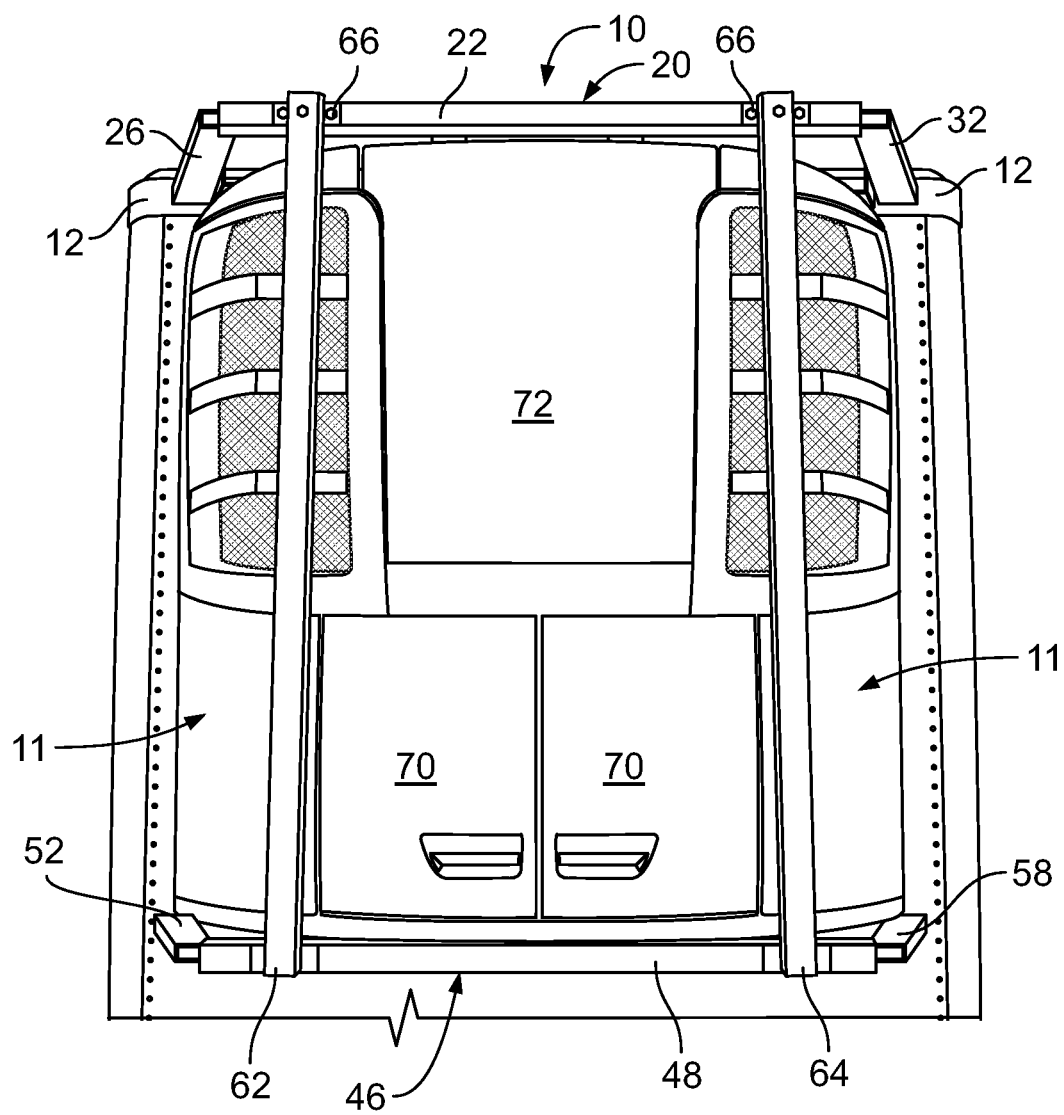
FIG. 1 is a front elevation view of one end of a shipping container with the protective frame mounted on the refrigeration unit.
Figure 4:
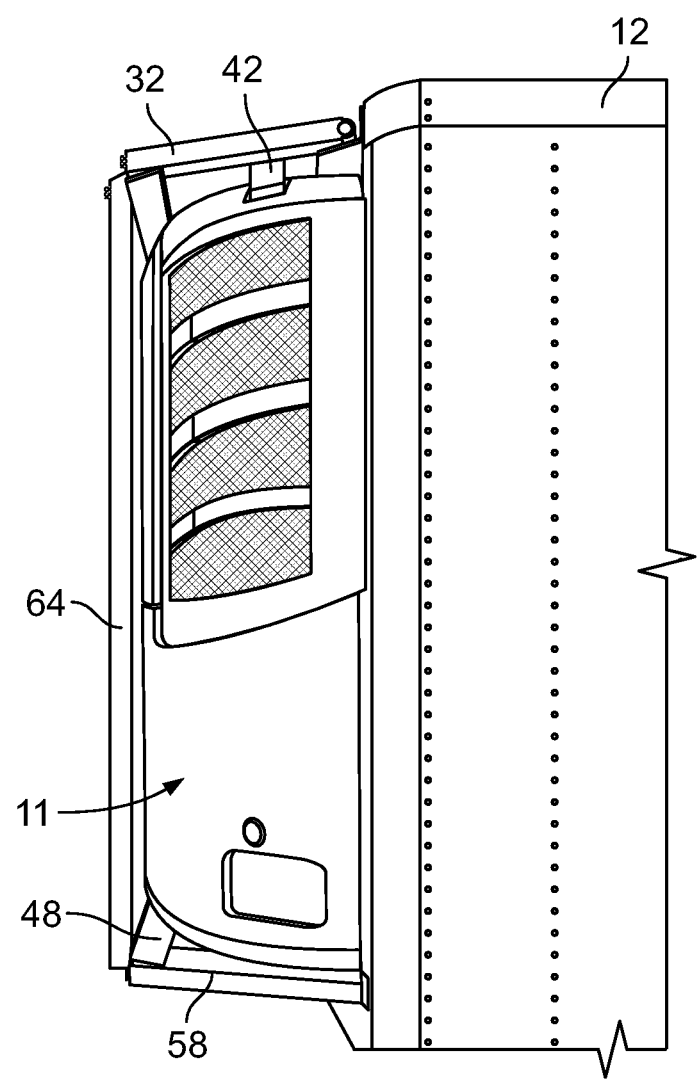
FIG. 4 is a left side view of the refrigeration unit and the protective frame mounted on the refrigeration unit.

Turning first to FIG. 1, there is illustrated a front view of a protective frame 10 for a refrigeration unit 11 that is mounted on the front of a trailer, an end of an intermodal shipping container, or, as seen in FIG. 4, mounted on another shipping or cargo container 12. Generally, these containers are intended for overseas shipping in which the container 12 is raised from a truck bed, rail car or from another ship onto an oceangoing vessel. However, the invention is not limited to these applications, but to any application in which the shipping containers may contact other objects or adjacent shipping equipment or structures. Also, throughout this application, the term "shipping container" is intended to include all forms of intermodal equipment including but not limited to trailers, intermodal shipping containers, or rail cars.

Figure 2:
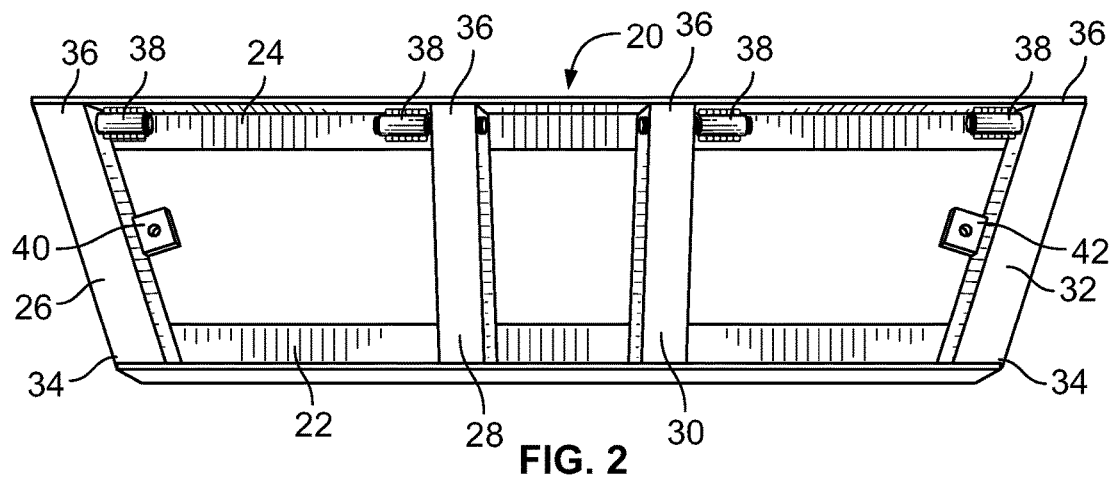
FIG. 2 is a top perspective view of the top frame assembled but not installed on the refrigeration unit.

FIG. 2 illustrates a top frame 20 assembled but not yet installed. The top frame 20 is comprised of a front horizontal angle member 22 and a rear horizontal angle member 24. There are four horizontal braces, a left horizontal brace 26, two horizontal center braces 28, 30, and a right horizontal brace 32 connecting the front horizontal angle member 22 to the rear horizontal angle member 24. The horizontal braces are preferably tubular in construction.

Each of the braces 26, 28, 30 and 32, have a proximal end 34 and a distal end 36. The proximal ends are welded to the front horizontal angle member 22. The distal ends 36 are connected to the rear horizontal angle member 24 by means of hinge pins engaging hinges 38. As illustrated, there are four hinges 38, one for attaching each of the braces 26, 28, 30 and 32. When assembled, this forms a rigid trapezoidal frame which will be bolted to the top of the refrigeration unit 11. The rear horizontal angle member 24 abuts the shipping container 12 but is not fastened to the shipping container itself. If additional braces are utilized for structural support, they likewise would be connected to the front horizontal angle member 22 and hingedly connected to the rear horizontal angle member 24. Although illustrated as a pin inserted into a tube type hinge, other hinge means are also available as will be apparent to those skilled in the art. The hinges 38 allow the top frame 20 to be pivoted upward about the rear horizontal angle member 24 for accessing the refrigeration unit 11 during maintenance.

Figure 5:
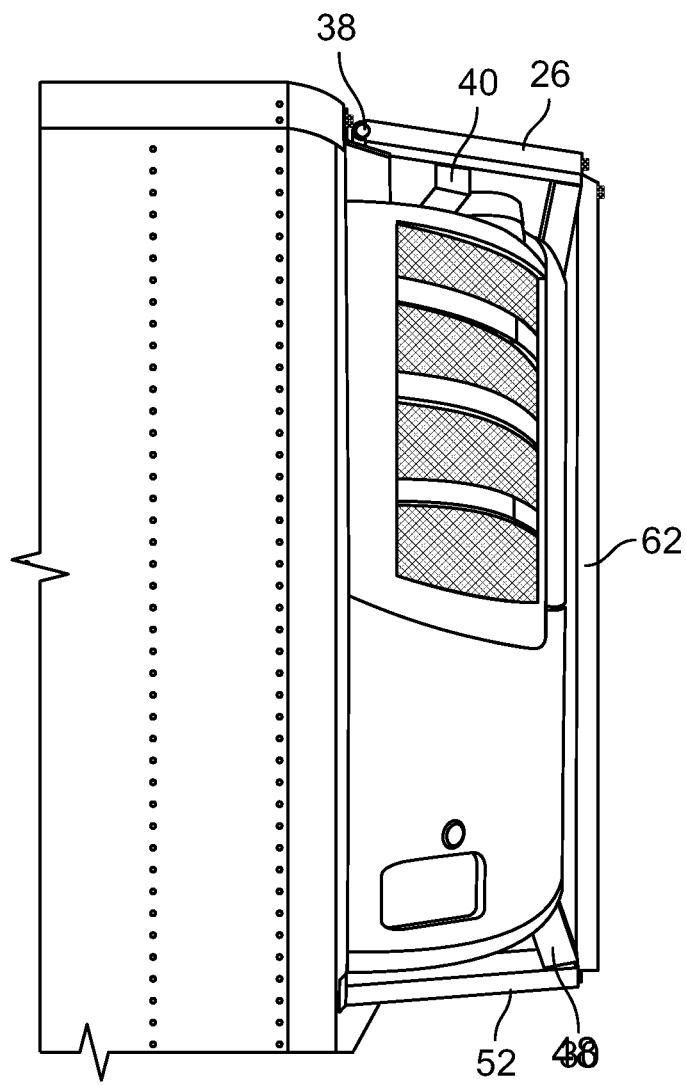
FIG. 5 is a right side view of the refrigeration unit and the protective frame mounted on the refrigeration unit.
Figure 6:
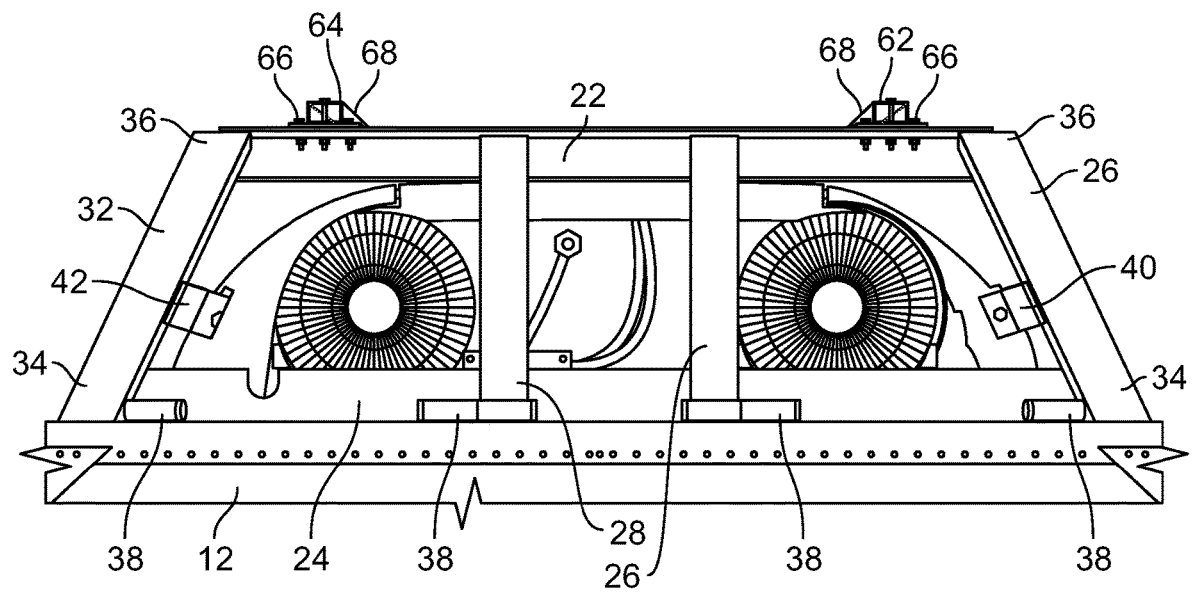
FIG. 6 is a top view of the top frame mounted on the refrigeration unit.
Figure 7:
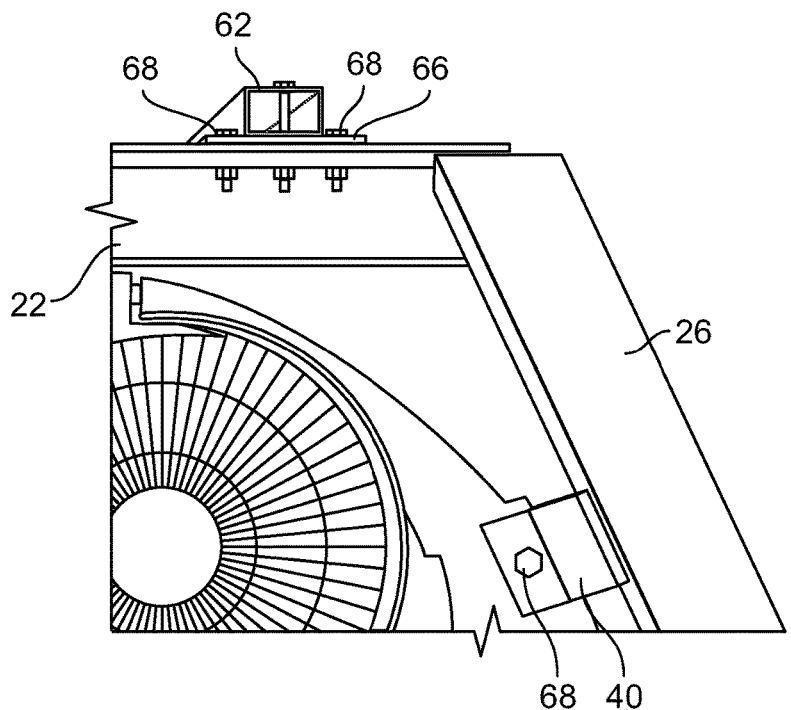
FIG. 7 is an enlarged view of the top right hand corner with portions removed of the top frame.

The rear horizontal angle member 24 is mounted on the refrigeration unit 11 by means of bolts passing into pre-existing holes in the refrigeration unit 11. Illustrated in FIGS. 4, 5 and 6 are pieces of tubing forming mounting brackets being a right angular brace 40 and left angular brace 42. These are bolted into existing receptacles in the refrigeration unit 11 and connect respectively the top right horizontal brace 26 and top left horizontal brace 32 to the refrigeration unit 11.

Figure 3:
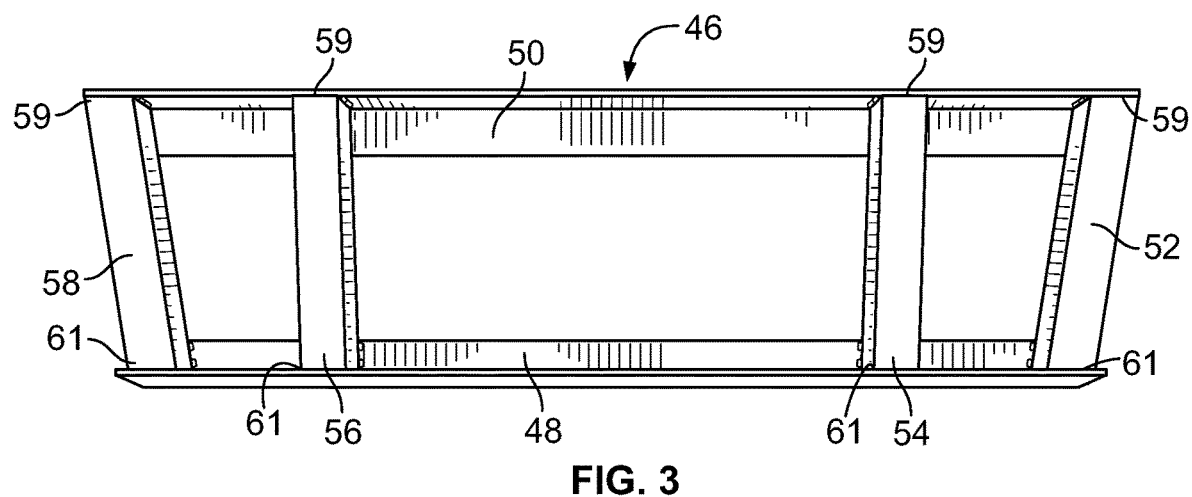
FIG. 3 is a bottom perspective view of the bottom frame assembled but not installed on the refrigeration unit.
Figure 8:
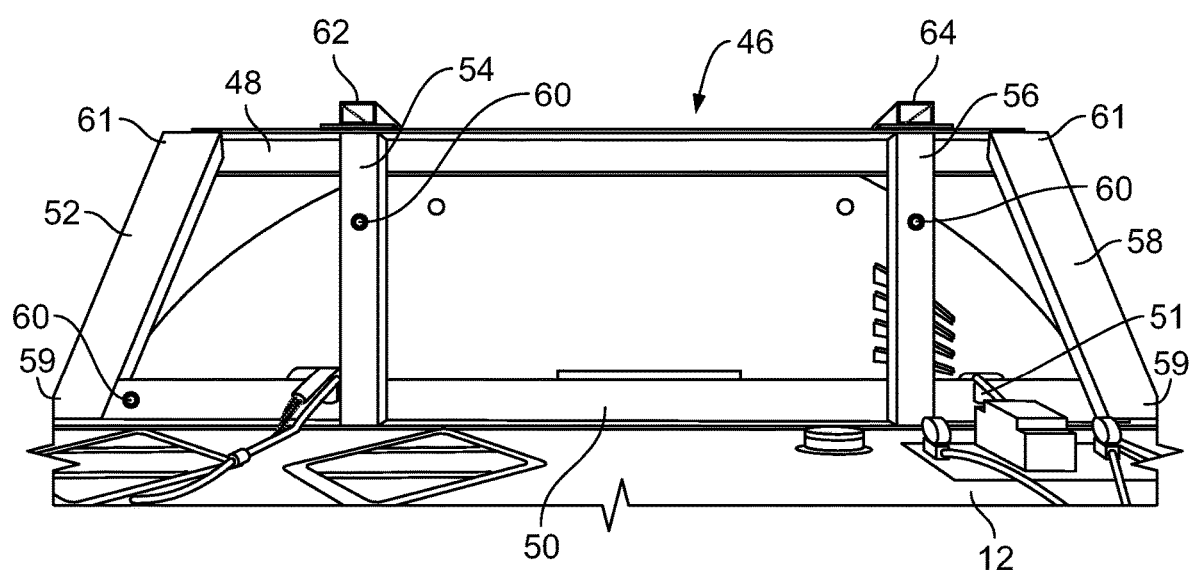
FIG. 8 is a bottom view of the bottom frame mounted on the refrigeration unit.

FIG. 3 illustrates a bottom frame 46 assembled but not yet installed. The bottom frame 46 is structurally similar to the top frame 20 in that it is comprised of a bottom front horizontal angle member 48, a bottom rear horizontal angle member 50, and four bottom horizontal braces being a bottom right horizontal brace 52, two bottom center horizontal braces 54, 56, and a bottom left horizontal brace 58. Each of the four braces 52, 54, 56, and 58, have a proximal end 59 and a distal end 61. The proximal ends 59 are welded to the bottom rear horizontal angle member 50 and the distal ends 61 are welded to the bottom front horizontal angle member 48. The bottom rear horizontal angle member 50 abuts the shipping container 12 but is not fastened to the shipping container 12. It may have cut-outs 51 (as seen in FIG. 8) to accommodate fuel, air or electrical lines. Additional fastening bolts 60 may be used to secure the bottom horizontal braces 52, 54, 56 and 58 to the refrigeration unit 11.

As seen in FIGS. 1, 4, 5 and 6 there are right and left vertical braces 62, 64 that connect the top frame 20 to the bottom frame 46. The top and bottom ends of the right and left vertical braces are connected by bolts 66 passing through mounting plates or brackets 68. The mounting plates 68 have bolt holes with receiving bolt holes in the vertical braces 62, 64. The bolts 66 pass through the front horizontal angle member 22 and bottom front horizontal angle member 48. It is necessary to have the ability to easily remove the bolts 66 from the top of the vertical right and left braces 62, 64 in order to release the top frame 20 from the vertical braces 62, 64. The vertical braces 62, 64 are preferably tubular for both weight and strength purposes. The vertical braces 62, 64 are spaced apart a sufficient distance to allow access to the access doors 70 of the refrigeration unit 11 so that they can be opened and closed without impairment. The right and left braces 62, 64 roughly align to the exterior profile of the air conditioning unit 11. This provides the greatest access for maintenance while providing the maximum protection area. These braces lend strength and stability without interfering with needed access for repair.

Figure 9:
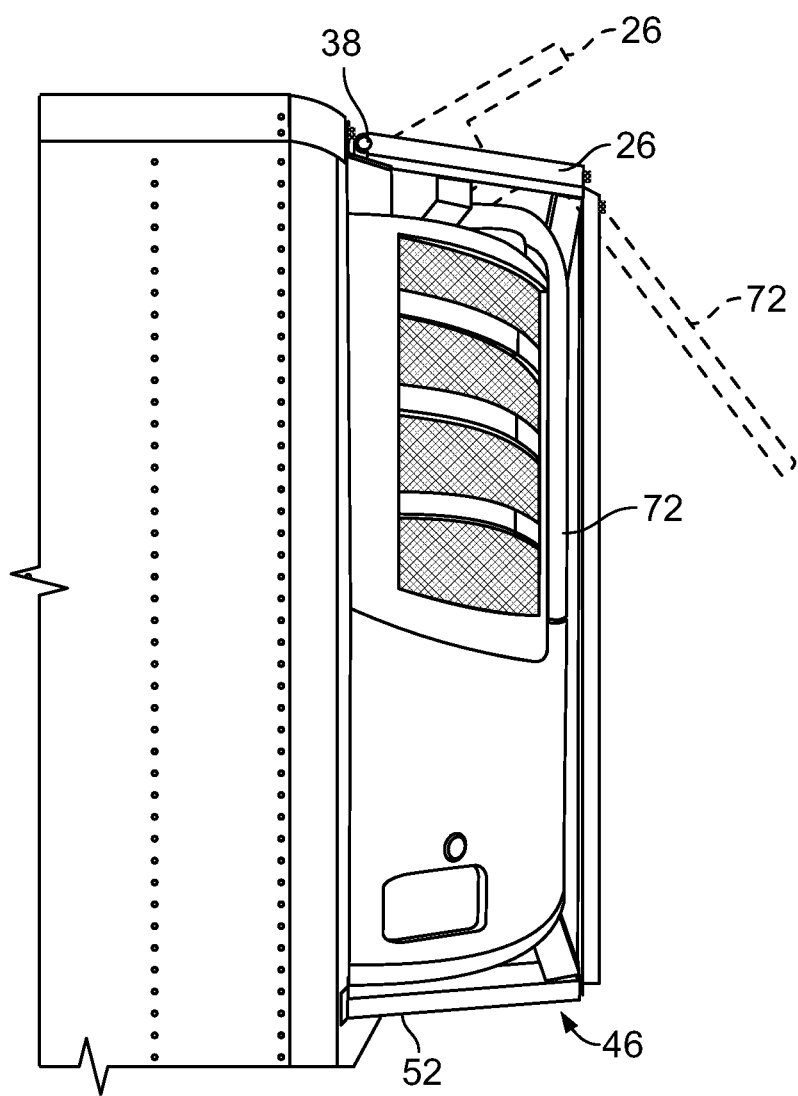
FIG. 9 is a right side view of the refrigeration unit with the inventive frame being shown in phantom in several positions as it is pivoted away from the top of the refrigeration unit.

In order to pivot the top frame 20 upward, the bolts 66 are unscrewed from the front horizontal angle member 22 and removed. This releases the left and right vertical braces from the front horizontal frame member 22. Right and left angular braces 40, 42 are removed from engagement with the refrigeration unit 11. Any additional mounting pieces that attach the top frame 20 to the refrigeration unit 11 are also removed. This releases the top frame 20 so that it can be pivoted upward as a single unit about the hinges 38. This is illustrated in phantom in FIG. 9. This allows the maintenance worker to access the inside of the refrigeration unit 11 as an access door 72 can now be raised without interference from the top frame assembly 20.

Thus, there has been provided a protective frame for refrigeration units mounted on shipping containers that fully satisfies the objects set forth above. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A protective frame for a refrigeration unit, the refrigeration unit attached to an end of a shipping container comprising:
    a bottom horizontal frame assembly having a bottom frame proximal end and a bottom frame distal end;
    a top horizontal frame assembly having an top frame proximal end and an top frame distal end,
    a left vertical frame member and a right vertical frame member, each having a lower end and an upper end, the upper ends releasably attached to the top frame assembly, and the lower ends attached to the bottom frame assembly, a hinge attached to the top frame proximal end of the top horizontal frame assembly for allowing the top horizontal frame assembly to pivot upward about the hinge,
    whereby the top frame assembly can be released from the left and right vertical frame members and pivoted upward about the hinge for providing access to the refrigeration unit.

2. The protective frame of claim 1 wherein the top frame assembly comprises an top front horizontal frame member, top rear horizontal frame member, top left horizontal brace and top right horizontal brace, the top left and top right horizontal braces having distal ends attached to the top front horizontal frame member, and proximal ends attached to the top rear horizontal frame member.

3. The protective frame of claim 2 wherein the top left and top right horizontal braces have the proximal ends attached by hinges to the rear horizontal angle member.

4. The protective frame of claim 2 wherein the top front horizontal frame member is an L-shaped angle with a horizontal leg and a vertical leg, and the distal ends of the top left and top right horizontal braces are welded to the horizontal leg.

5. The protective frame of claim 1 wherein the refrigeration unit has a pair of doors with a height and a width, and the left vertical frame member and the right vertical frame member are mounted in spaced parallel relationship apart from each other a distance equal to or greater than the width of the doors.

6. The protective frame of claim 1 wherein the bottom frame assembly comprises a bottom front horizontal frame member, bottom rear horizontal frame member, bottom left horizontal brace and bottom right horizontal brace, the bottom left and bottom right horizontal braces having distal ends attached to the bottom front horizontal frame member.

7. The protective frame of claim 6 wherein the bottom left and bottom right horizontal braces have proximal ends attached to the bottom rear horizontal frame member.

8. The protective frame of claim 4 wherein the left vertical frame member and the right frame vertical frame member have their upper ends releasably attached to the top frame assembly by means of bolts passing through the left and right vertical frame members and through the top L-shaped horizontal frame member.

9. The protective frame of claim 1 and further comprising bracing members attached to the top left and right horizontal braces and to the refrigeration unit, the bracing members releasably attached to the refrigeration unit and released from the refrigeration unit when the top frame member is released from the left and right vertical frame members.

10. A protective frame for a refrigeration unit, the refrigeration unit attached to an end of a shipping container comprising:
    a bottom horizontal frame assembly attached to the refrigeration unit, the bottom frame assembly comprised of a bottom front horizontal frame member, bottom rear horizontal frame member, a bottom horizontal brace, the bottom horizontal brace having a distal end attached to the bottom front horizontal frame member, and a proximal end attached to the bottom rear horizontal frame member;
    a top horizontal frame assembly, the top frame assembly comprising a top front horizontal frame member, a top rear horizontal frame member, a top left horizontal brace and a top right horizontal brace, the top left and top right horizontal braces having distal ends attached to the top front horizontal frame member, and proximal ends attached to the top rear horizontal frame member;

a left vertical frame member and a right vertical frame member, each having a lower end securely connected to the bottom horizontal frame assembly and an upper end releasably connected to the top horizontal frame assembly, the left and right vertical frame members mounted in spaced parallel relationship with each other;

hinge means attached to the top horizontal frame assembly for allowing the top horizontal frame to pivot upward about the hinge means, whereby the top horizontal frame assembly can be released from the left and right vertical frame members and pivoted upward about the hinge means for providing access to the refrigeration unit when the top horizontal frame assembly is released from the upper end of the vertical frame members.

11. The protective frame of claim 10 wherein the hinge means comprises at least two hinges attached to the top rear horizontal frame member.

12. The protective frame of claim 10 wherein the bottom horizontal frame assembly has four sides that form a quadrilateral.

13. The protective frame of claim 10 wherein the top horizontal frame assembly has four sides that form a quadrilateral.

14. The protective frame of claim 10 wherein the refrigeration unit has a pair of doors with a height and a width, and the left vertical frame member and the right vertical frame member are mounted in spaced parallel relationship apart from each other a distance equal to or greater than the width of the doors.

* * * * *